(12) United States Patent
Yamini

(10) Patent No.: US 11,035,719 B2
(45) Date of Patent: Jun. 15, 2021

(54) SCALE ASSEMBLIES FOR PROVIDING NUTRITIONAL CONTENT

(71) Applicant: Esaa Yamini, Austin, TX (US)

(72) Inventor: Esaa Yamini, Austin, TX (US)

( * ) Notice: Subject to any disclaimer, the term of this patent is extended or adjusted under 35 U.S.C. 154(b) by 176 days.

(21) Appl. No.: 16/453,906

(22) Filed: Jun. 26, 2019

(65) Prior Publication Data

US 2020/0064181 A1 Feb. 27, 2020

Related U.S. Application Data

(60) Provisional application No. 62/720,364, filed on Aug. 21, 2018.

(51) Int. Cl.
| | |
|---|---|
| *G01G 19/414* | (2006.01) |
| *G01G 21/10* | (2006.01) |
| *G01G 21/23* | (2006.01) |
| *G01G 21/28* | (2006.01) |
| *G01G 19/52* | (2006.01) |

(52) U.S. Cl.
CPC ......... *G01G 19/4146* (2013.01); *G01G 21/10* (2013.01); *G01G 21/23* (2013.01); *G01G 21/28* (2013.01); *G01G 21/283* (2013.01); *G01G 19/52* (2013.01)

(58) Field of Classification Search
CPC .... G01G 19/4146; G01G 21/10; G01G 21/23; G01G 21/235; G01G 21/28; G01G 21/283; G01G 19/52
See application file for complete search history.

(56) References Cited

U.S. PATENT DOCUMENTS

| | | | | |
|---|---|---|---|---|
| 3,993,150 | A * | 11/1976 | Brosh | G01G 3/1402 177/211 |
| 4,911,256 | A * | 3/1990 | Attikiouzel | G01G 3/147 177/25.16 |
| 5,044,453 | A * | 9/1991 | Bankier | G01G 19/4146 177/25.16 |
| 5,388,043 | A * | 2/1995 | Hettinger | G01G 19/4146 128/921 |
| 5,801,339 | A * | 9/1998 | Boult | G01G 17/08 177/261 |
| 6,978,221 | B1 * | 12/2005 | Rudy | G01G 19/4146 128/921 |
| 7,541,548 | B1 * | 6/2009 | Sze | G01G 19/4146 177/25.16 |

(Continued)

*Primary Examiner* — Randy W Gibson
(74) *Attorney, Agent, or Firm* — UCLA Patent Law Clinic

(57) ABSTRACT

Systems and methods for scale assemblies for providing nutritional content in accordance with embodiments of the invention are disclosed. In one embodiment, a scale assembly for providing nutritional content, the scale assembly in connection with a client device, the scale assembly comprising: a platform for receiving a food item; a pole connected to a center portion of the platform, wherein the pole applies a pressure to a surface of the client device based on a weight of the food item; a centerpiece having a hole for receiving the pole such that the pole moves vertically through the hole; at least one support leg, wherein the at least one support leg is connected to the centerpiece and provides support to the scale assembly; and wherein the pressure applied by the pole to the surface of the client device is used to calculate the nutritional content of the food item.

20 Claims, 12 Drawing Sheets

(56) References Cited

U.S. PATENT DOCUMENTS

| | | | |
|---|---|---|---|
| 8,330,057 B2* | 12/2012 | Sharawi | G01G 19/4146 177/25.16 |
| 10,060,783 B2* | 8/2018 | Liu | G01G 19/52 |
| 2002/0124017 A1* | 9/2002 | Mault | A61B 5/222 600/300 |
| 2004/0118618 A1* | 6/2004 | Davidson | G01G 19/4146 177/25.13 |
| 2005/0184148 A1* | 8/2005 | Perlman | G01G 23/3735 235/383 |
| 2007/0050058 A1* | 3/2007 | Zuziak | G16H 20/60 700/90 |
| 2011/0242010 A1* | 10/2011 | Chang | G01G 21/22 345/173 |
| 2011/0297456 A1* | 12/2011 | Davidson | G01G 19/4146 177/1 |
| 2012/0055718 A1 | 3/2012 | Chen | |
| 2014/0020961 A1* | 1/2014 | Luo | G01G 23/01 177/25.15 |
| 2014/0063180 A1 | 3/2014 | Sharma | |
| 2014/0089231 A1* | 3/2014 | Jhunja | G01G 7/06 705/407 |
| 2014/0214446 A1 | 7/2014 | Nusbaum et al. | |
| 2014/0224551 A1 | 8/2014 | Turner | |
| 2016/0034764 A1 | 2/2016 | Connor | |
| 2016/0063734 A1 | 3/2016 | Divakaran et al. | |
| 2016/0260352 A1 | 9/2016 | Ortiz | |
| 2017/0234721 A1 | 8/2017 | Liu | |
| 2018/0149519 A1 | 5/2018 | Connor | |

* cited by examiner

SCALE ASSEMBLIES FOR PROVIDING NUTRITIONAL CONTENT

CROSS-REFERENCE TO RELATED APPLICATIONS

The current application claims priority to U.S. Provisional Patent Application No. 62/720,364, filed on Aug. 21, 2018, the disclosure of which is incorporated herein by reference.

FIELD OF THE INVENTION

The present invention generally relates to scales and more specifically to scale assemblies for providing nutritional content.

BACKGROUND

Food and beverages (may collectively be referred to as "food") may be evaluated by their nutritional content. Food is a fundamental component of survival. Its nutritional content can be broken down into calories, vitamins, minerals, carbohydrates, proteins, fats, sugars, and a variety of other components that each reveal some information about the quality of the food. With the industrial revolution and the globalization of the economy, the variety of food choices has increased exponentially. Food is no longer limited to what one can grow, forage, raise, or hunt but now includes what one can engineer, import, or create in a laboratory. As such, it is increasingly difficult to identify the quality of the food one consumes on a day to day basis.

Many may want to know what they are putting into their bodies in order to adhere to a healthier diet, a particular lifestyle, to avoid an allergen, and/or a number of other reasons. While an ingredients list on a packaged product may tell the consumer broadly what they are putting into their bodies, the ingredients list on many products often include ingredients that are foreign to the average consumer.

SUMMARY OF THE INVENTION

The various embodiments of the present scale assemblies contain several features, no single one of which is solely responsible for their desirable attributes. Without limiting the scope of the present embodiments, their more prominent features will now be discussed below. In particular, the present scale assemblies will be discussed in the context of determining the nutritional content of a food item. However, the use of a scale assembly for a food item is merely exemplary and various other scale assemblies may be utilized for determining the nutritional content of a food item or to determine any information about any other item as appropriate to the requirements of a specific application in accordance with various embodiments of the invention. After considering this discussion, and particularly after reading the section entitled "Detailed Description," one will understand how the features of the present embodiments provide the advantages described here.

One aspect of the present embodiments includes the realization that in current scale assemblies other than the present embodiments, the scales are not portable nor wirelessly interactive with a client device that may include a capacitive touch screen. For example, many nutritional scales are bulky and meant to be used solely in the home. The present embodiments solve such problems by providing a scale that may be separated and that may be coupled with a client device for determining nutritional content of various items. The present embodiments thus advantageously enable a user to collapse and easily transport a scale assembly and have access to nutritional content information. The present embodiments provide these advantages and enhancements, as described below.

In a first aspect, a scale assembly for providing nutritional content is provided, the scale assembly in connection with a client device, the scale assembly comprising: a platform for receiving a food item; a pole connected to a center portion of the platform, wherein the pole applies a pressure to a surface of the client device based on a weight of the food item; a centerpiece having a hole for receiving the pole such that the pole moves vertically through the hole; at least one support leg, wherein the at least one support leg is connected to the centerpiece and provides support to the scale assembly; and wherein the pressure applied by the pole to the surface of the client device is used to calculate the nutritional content of the food item.

In an embodiment of the first aspect, the pole rotates but has limited movement around a horizontal direction.

In another embodiment of the first aspect, the pole is threaded through the hole of the centerpiece.

In another embodiment of the first aspect, a first end of the pole is connected to a bottom surface of the platform.

In another embodiment of the first aspect, the first end of the pole is threaded such that the first end of the pole is screwed into a receiving hole in the bottom surface of the platform.

In another embodiment of the first aspect, the first end of the pole is flat such that the first end of the pole snaps into a receiving hole in the bottom surface of the platform.

In another embodiment of the first aspect, the first end of the pole is flat such that the first end of the pole adheres to the bottom surface of the platform.

In another embodiment of the first aspect, a second end of the pole applies the pressure to the surface of the client device.

In another embodiment of the first aspect, the second end of the pole is a hemisphere shape.

In another embodiment of the first aspect, the second end of the pole includes a cushion material.

In another embodiment of the first aspect, the client device includes a digital scale for measuring the pressure applied based on the weight of the food item; and the weight of the food item is calculated by the client device based on the pressure applied to the client device and accounting for a frictional force between the pole and the hole.

In another embodiment of the first aspect, the weight of the food item is calculated by the client device further based on accounting for a pressure dispersed along the at least one support leg.

In another embodiment of the first aspect, the surface of the client device comprises a pressure sensitive touch screen.

In another embodiment of the first aspect, the at least one support leg swivels around the centerpiece.

In another embodiment of the first aspect, the at least one support leg includes a first leg and a second leg that are spaced apart creating an open space for placing the client device within the open space.

In another embodiment of the first aspect, the client device calculates the nutritional content of the food item based on the pressure applied by the pole to the surface.

In another embodiment of the first aspect, wherein the client device calculates the nutritional content of the food item based on an identification of the food item wherein the user selects the food item on the client device to provide the identification of the food item.

In another embodiment of the first aspect, the client device calculates the nutritional content of the food item based on the user scanning the food item with the client device to provide the identification of the food item.

In another embodiment of the first aspect, the client device measures the pressure applied by the pole and transmits a calculated weight to a server.

In another embodiment of the first aspect, the server calculates the nutritional content of the food item based on the calculated weight and the identification of the food item.

BRIEF DESCRIPTION OF THE DRAWINGS

The various embodiments of the present scale assembly now will be discussed in detail with an emphasis on highlighting the advantageous features. These embodiments depict the novel and non-obvious scale assembly shown in the accompanying drawings, which are for illustrative purposes only. These drawings include the following figures.

DETAILED DESCRIPTION OF THE DRAWINGS

Figure 1:
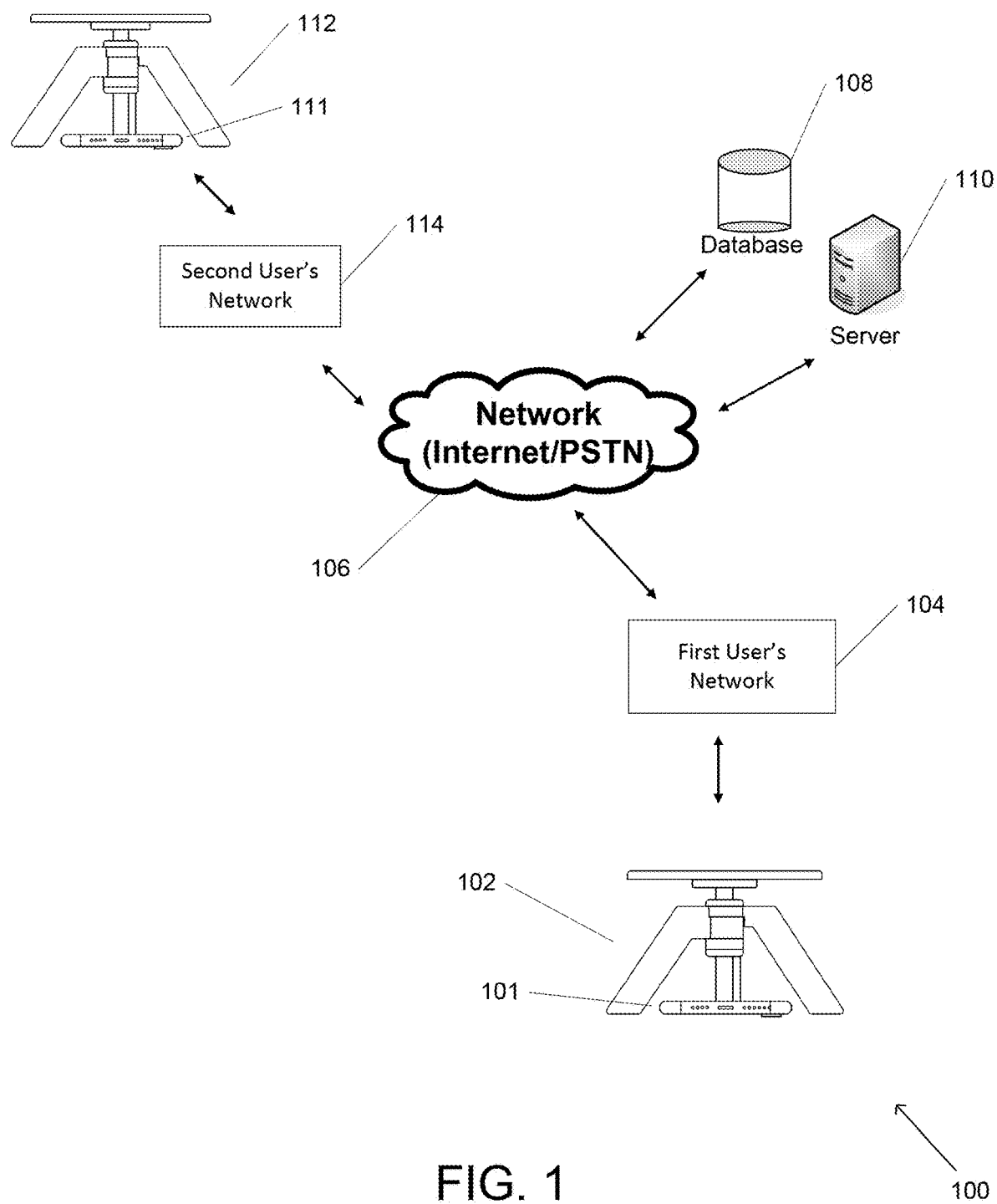
FIG. 1 is a system diagram of a scale assembly in connection with a client device in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, systems and methods for measuring nutritional content of a food item using scale assemblies in accordance with embodiments of the invention are disclosed. In many embodiments, a scale assembly may work in connection with a client device (e.g., a smartphone, tablet, etc.) and may include a platform apparatus for receiving a food item and at least one support leg that provides support to the scale assembly. In various embodiments, the client device may be utilized for receiving pressure applied by the scale assembly and for calculating the nutritional content (may also be referred to as "nutritional information") of the food item. As further described below, the client device may also receive food data and display nutritional information. In some embodiments, the client device may receive food data (e.g., food type, etc.) from a user and transmit the food data to a server. In some embodiments, the server may include and/or may access a database storing nutritional information and transmit the nutritional information to the client device. In many embodiments, the client device may receive food data from the user and calculate and display nutritional data to the user based on the food data and the applied pressure. As further described below, in several embodiments, the platform apparatus of the scale assembly may include a platform for receiving a food item, at least one support leg that provides support to the scale assembly, and a pole for applying pressure to a top surface of a client device. The pole may be connected to the center of the platform and may freely rotate around an axis. In several embodiments, the at least one leg may be connected to a centerpiece that has an opening. In some embodiments, the pole may be connected to the platform and may be threaded through the opening of the centerpiece. A scale assembly system in accordance with embodiments of the invention are further discussed below.

Scale Assembly Systems

Scale assemblies may be used to determine the nutritional content (e.g. caloric data, vitamin data, mineral data, ingredient data, etc.) of a variety of foods. Further, scale assemblies may work in connection with a client device that has access to the Internet for communicating with a server.

A system diagram of a scale assembly in connection with a client device in accordance with an embodiment of the invention is shown in FIG. 1. The system 100 may include a first scale assembly 102 configured to interact with a first client device 101, as further described below. In many embodiments, the first client device 101 may be connected to a first user's network 104. For example, the first user's network 104 may be either a wired or wireless network that allows the first client device 101 to access the Internet 106. For example, the first user's network 104 may be a wireless access point such as, but not limited to, WiFi. In other embodiments, the first client device 101 may access the Internet 106 using a cellular network and/or any other network or protocol known to one of ordinary skill in the art. For example, in some embodiments, the first user's network 104 may include a wireless connection to a wireless internet router in the first user's home. The wireless internet router may communicate with the first user's home modem which may receive and transmit data. The wireless connection may be facilitated by the first user's client device 101 by a network card contained within the first client device 101. Data may be passed along the Internet 106 to a server 110 or a database 108, as further described below. In other embodiments, the first user's network 104 may include a wireless connection to a wireless internet router in a public space.

In further reference to FIG. 1, the first scale assembly 102 may include a platform for receiving a food item, as further described below. In many embodiments, the first scale assembly 102 apply a pressure onto the first client device 101 in proportion to the weight of the food item, as further described below. For example, a food item may be placed on the platform of the first scale assembly 102 for determining the nutritional content of the food item, as further described below. The first scale assembly 102 may apply a pressure to the first client device 101, where the first client device 101 may calculate and display nutritional content 1108 about the food item. For example, in many embodiments, the client device may download and run one or more applications for performing the various functions and processes described herein, as further described below. In many embodiments, data may be transmitted via the first user's network 104 to the Internet 106 and may be added to the database 108.

The system 100 may also include a second scale assembly 112 configured to interact with a second client device 111, as further described below. In many embodiments, the second client device 111 may be connected to a second user's network 114. For example, the second user's network 114 may be either a wired or wireless network that allows the second client device 111 to access the Internet 106. For example, the second user's network 114 may be a wireless access point such as, but not limited to, WiFi. In other embodiments, the second client device 111 may access the Internet 106 using a cellular network and/or any other network or protocol known to one of ordinary skill in the art. For example, in some embodiments, the second user's network 114 may include a wireless connection to a wireless internet router in the second user's home. The wireless internet router may communicate with the second user's home modem which may receive and transmit data. The wireless connection may be facilitated by the second user's client device 111 by a network card contained within the second client device 111. Data may be passed along the Internet 106 to the server 110 and/or the database 108, as further described below. In other embodiments, the second user's network 114 may include a wireless connection to a wireless internet router in a public space.

In further reference to FIG. 1, the second scale assembly 112 may include a platform for receiving a food item, as further described below. In many embodiments, the second scale assembly 112 apply a pressure onto the second client device 111 in proportion to the weight of the food item, as further described below. For example, a food item may be placed on the platform of the second scale assembly 112 for determining the nutritional content of the food item, as further described below. The second scale assembly 112 may apply a pressure to the second client device 111 which may calculate and display nutritional data about the food item. In many embodiments, data may be transmitted via the second user's network 114 to the Internet 106 and may be added to the database 108.

Although specific systems for a scale assembly in connection with a mobile network are discussed above with respect to FIG. 1, any of a variety of systems including a variety of client devices, servers, communicating using various communication protocols as appropriate to the requirements of a specific application can be utilized in accordance with embodiments of the invention. For example, a system may include any number of client devices, scale assemblies, networks, servers, and/or databases. A scale assembly in accordance with embodiments of the invention are discussed further below.

Scale Assemblies

Scale assemblies may measure the weight of a food item placed on a platform of the scale in conjunction with an application contained on the client device. In many embodiments, the scale assemblies may provide pressure to the touch screen of the client device to determine the weight of the food item and provide nutritional content.

Figure 2:
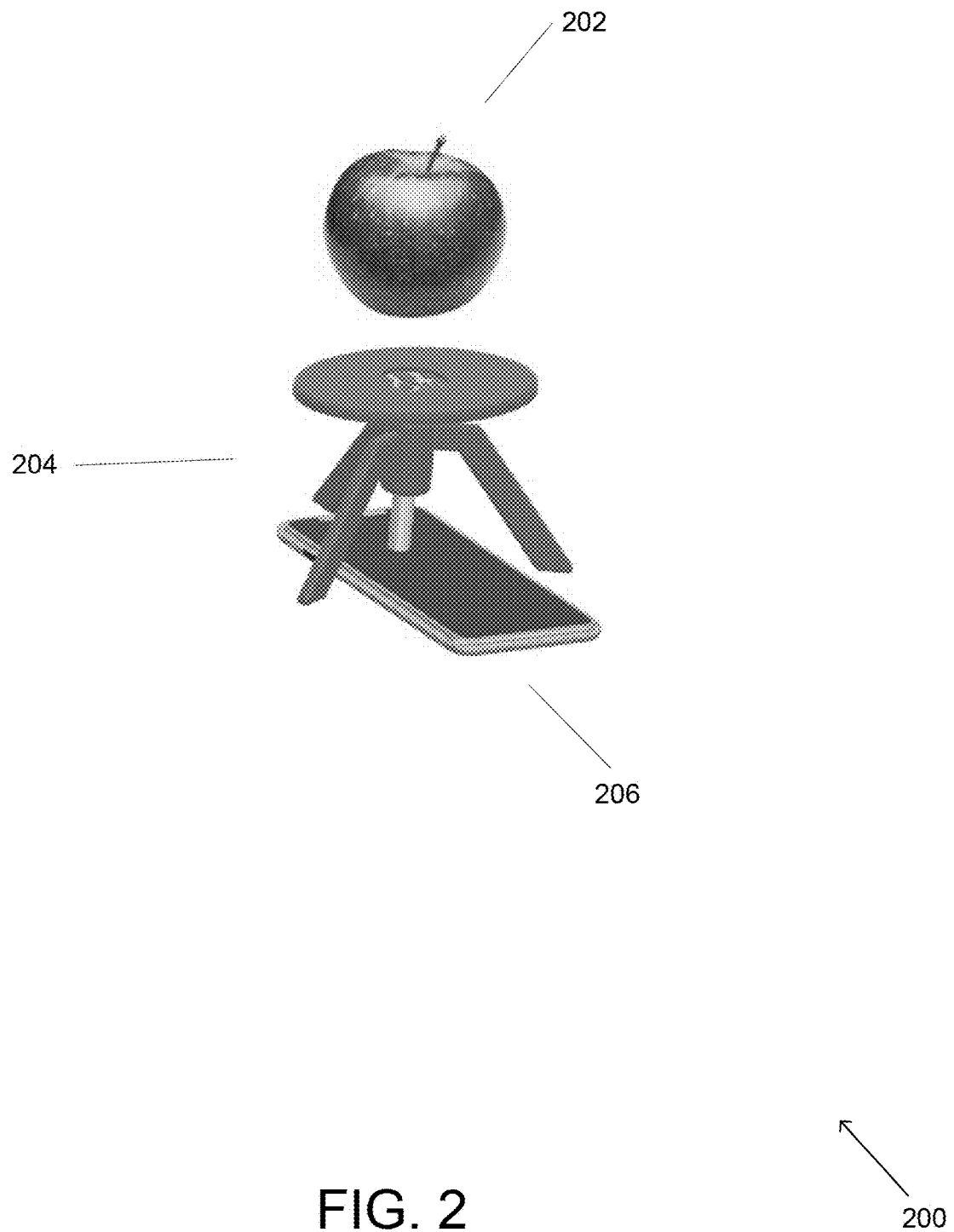
FIG. 2 illustrates a scale assembly in accordance with an embodiment of the invention.

A scale assembly in accordance with an embodiment of the invention is shown in FIG. 2. A food item 202 may be placed on a scale assembly 204. The scale assembly 204 may deliver the weight of the food item 202 to a client device 206. In many embodiments, the client device 206 may include a pressure sensitive touchscreen and/or a capacitive touchscreen. In various embodiments, the capacitive touchscreen may receive input when an electrostatic field of the touchscreen is distorted. For example, the glass of the capacitive touchscreen may be coated with a transparent conductor including (but not limited to) ITO, FTO, AZO, etc. Materials that may function as electrical conductors may distort the electrostatic field of the touch screen when in contact. In some embodiments, the scale assembly 204 may include material that may serve as an electrical conductor. The distortion in the electrostatic field of the capacitive touchscreen may be measured as a change in capacitance. In many embodiments, the change in capacitance may be calculated by the operating system contained in the client device 206 to determine the location where the contact occurs. In some embodiments, the operating system contained in the client device 206 may be configured to determine force of the pressure applied to the pressure sensitive touchscreen.

Figure 3:
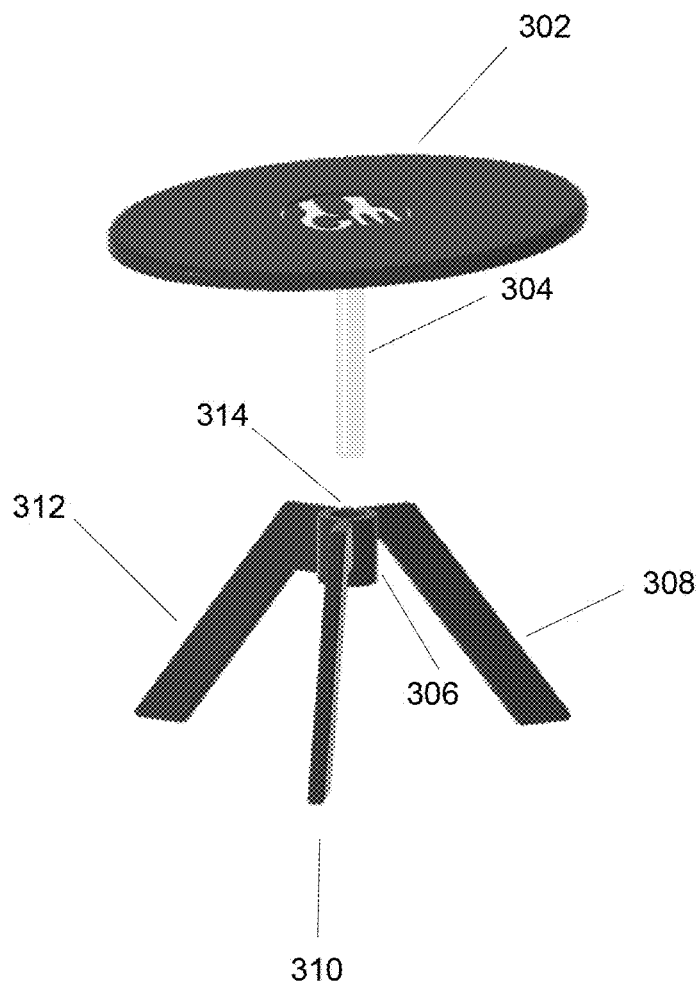
FIG. 3 illustrates a separated scale assembly in accordance with an embodiment of the invention.

A separated scale assembly 300 in accordance with an embodiment of the invention is illustrated in FIG. 3. In many embodiments, the scale assembly 300 may be separated into at least two parts. The scale assembly 300 may include a platform 302, a pole 304, at least one support leg 308, 310 and 312, and a centerpiece 306. In various embodiments, the platform 302 may contain a center portion. In some embodiments, the first support leg 308, the second support leg 310, and/or the third support leg 312 may be connected to the centerpiece 306. The centerpiece 306 may have an opening 314 to receive the pole 304. The pole 304 may be connected to the center portion of the platform 302. In various embodiments, the pole 304 may freely rotate. In many embodiments, a first end of the pole 304 may be connected to the center portion of the platform 302 and a second end of the pole 304 may be threaded through the opening 314 of the centerpiece 306. The second end of the pole 304 may be placed in contact with the touchscreen of the client device such that pressure may be transferred from the scale assembly to the client device. In some embodiments, the at least one support leg 308, 310 and 312 may be spaced to create an open space for placing the client device. A food item may be placed on the platform 302 such that the platform 302 transfers the weight of the food item along the pole 304 to apply pressure to the touchscreen of the client device.

Figure 4A:
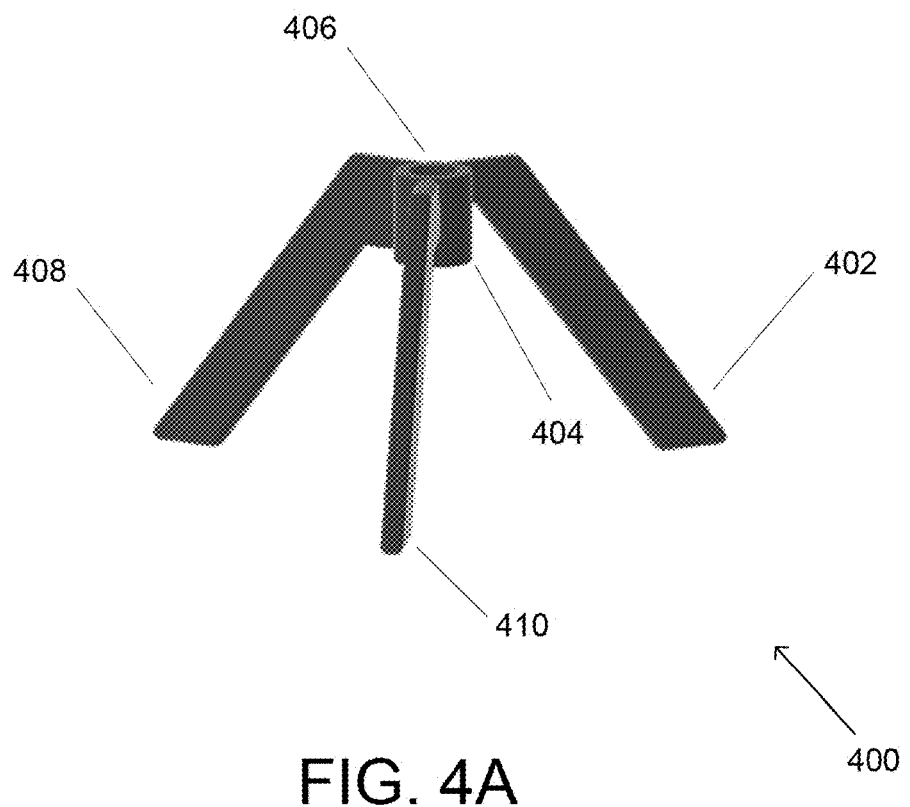
FIGS. 4A-4B illustrate the plurality of legs in open and closed conformations in accordance with an embodiment of the invention.
Figure 4B:
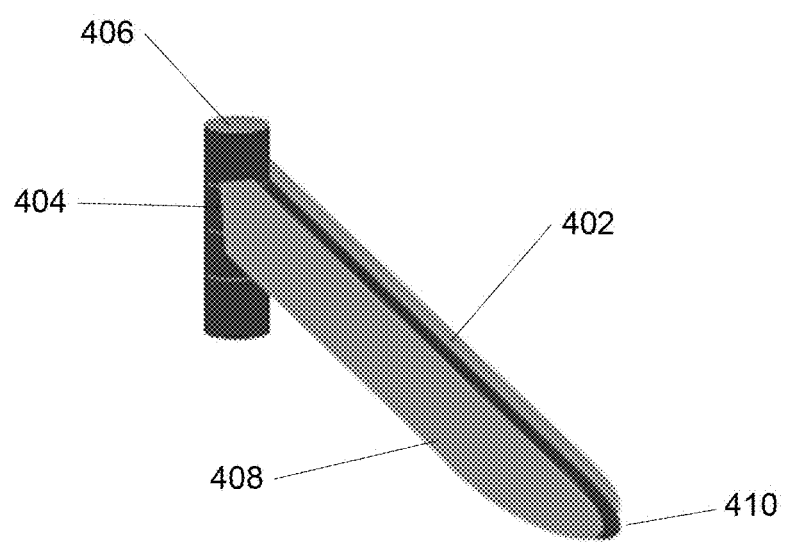

A plurality of legs in open and closed configurations in accordance with an embodiment of the invention is shown in FIGS. 4A and 4B. In some embodiment, the number of the legs may be varied. In many embodiments, the at least one support leg 402, 408 and 410 may be connected to a centerpiece 404. The at least one support leg 402, 408 and 410 may take on an open configuration 400 (as illustrated in FIG. 4A) such that the first support leg 402, the second support leg 408, and the third support leg 410 may be opened such that the first support leg 402, the second support leg 408, and the third support leg 410 may not be in direct contact. Further, the first support leg 402, the second support leg 408, and the third support leg 410 may pivot around the centerpiece 404 such that first support leg 402, the second support leg 408, and the third support leg 410 may adopt a closed configuration 430 (as illustrated in FIG. 4B). In many embodiments, the closed configuration 430 of the at least one support leg 402, 408 and 410 may permit the scale assembly 204 to collapse and be transported easily. The open configuration 400 of the at least one support leg 402, 408 and 410 may provide an open space in which to place a client device. In many embodiments, the at least one support leg 402, 408 and 410 may adopt an open configuration such that the client device may be placed in the openings between the first support leg 402, the second support leg 408, and the third support leg 410. The pole 304 may be threaded through the opening 406 of the centerpiece 404 in when the at least one support leg 402, 408 and 410 adopt either the open configuration 400 or the closed configuration 430.

Although specific scale assemblies are discussed above with respect to FIGS. 2-4B, any variety of structures including a variety of materials, including, but not limited to, one, two and/or three support legs, applying pressure along a pole to a capacitive touchscreen of a client device as appropriate to the requirements can be utilized in accordance with embodiments of the invention. A platform apparatus in accordance with embodiments of the invention are discussed further below.

Platform Apparatuses

Figure 5A:
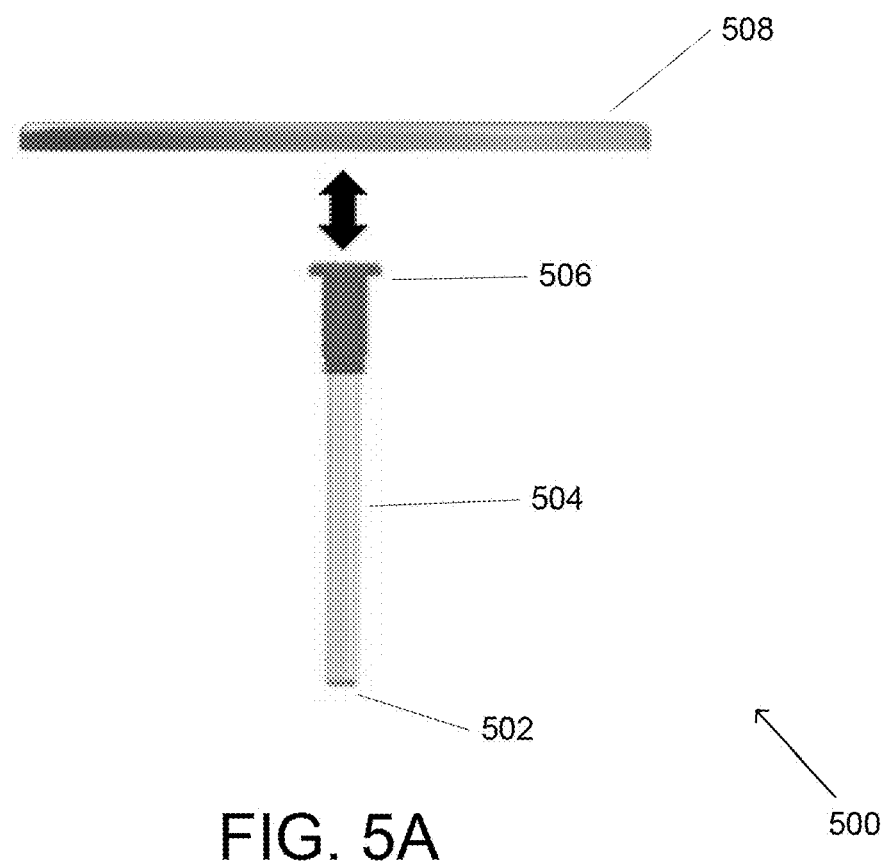
FIG. 5A illustrates a platform apparatus in accordance with an embodiment of the invention.

Scale assemblies may include a platform apparatus for receiving a food item. As described above, the weight of the food item may transfer a force along a pole to a touch screen of a client device. In many embodiments, the platform may be connected to the pole. A platform apparatus in accordance with an embodiment of the invention is illustrated in FIG. 5A. In some embodiments, a platform 508 may be connected to a first end 506 of a pole 504. The platform 508 and the pole 504 may include a sturdy material such that the platform apparatus 500 may support the weight of a food item without collapsing. Potential materials for the platform apparatus 500 may include, but are not limited, to hard plastic, silicon, and metal. In many embodiments, the platform 508 may be a flat, level surface on which a food item may be set without rolling or sliding off. A platform 508 may take on any number of shapes including, but not limited to, a square, circle, rectangle, or oval. Further, the platform 508 and the pole 504 may include a vessel to receive the food item without collapsing. In various embodiments, the platform 508 may be a flat, level surface on which the vessel may be set without rolling or sliding off.

Figure 5B:
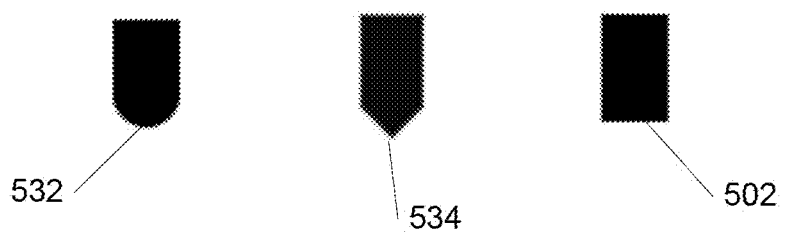
FIG. 5B illustrates a pole tip in accordance with some embodiments of the invention.

A pole may include a tip (may also be referred to as "second pole end") that is in contact with a surface of a client device. A pole tip in accordance with some embodiments of the invention is illustrated in FIG. 5B. The pole 504 may have different shapes at the second end 502 of the pole. In some embodiments, the second pole end 502 may be flat. The flat second pole end 502 may come into contact with a client device. The weight of a food item may be transferred from the platform 508, along the pole 504 and dispersed evenly across the surface of the flat pole tip 502. In several embodiments, the flat pole tip 502 may include a material that may be electrically conductive, e.g., for capacitive feature. For example, the flat pole tip 502 may include a housing for accommodating a capacitive material or a battery. The flat pole tip 502 may disrupt the electrostatic field of a capacitive touchscreen of the client device such that the disruption may cause a change in capacitance. In some embodiments, the operating system on the client device may calculate the change in capacitive appropriately to determine the location where a contact occurs. In various embodiments, the operating system contained in the client device may be configured to determine force of the pressure applied to the pressure sensitive touchscreen. In many embodiments, an application stored on the client device may calculate the resulting location and force of the change to determine the weight of the food item.

In some embodiments, the second pole end may be come to a point. A pointed second pole end 534 may come into contact with a client device. The weight of a food item may be transferred from the platform 508, along the pole 504 and dispersed at a localized point on the pointed pole tip 534. In several embodiments, the pointed pole tip 534 may include a material that may be electrically conductive. The pointed pole tip 534 may disrupt the electrostatic field of the capacitive touchscreen of the client device such that the disruption may cause a change in capacitance. The operating system on the client device may calculate the change in capacitive appropriately to determine the location and force of the change in capacitance. An application stored on the client device may appropriately calculate the resulting location and force of the change to determine the weight of the food item.

In some embodiments, the second pole end may be a hemisphere. A curved second pole end 532 may come into contact with a client device. The weight of a food item may be transferred from the platform 508, along the pole 504 and dispersed along the curved second pole end 532. In several embodiments, the curved pole tip 532 may include a material that may be electrically conductive. The pointed pole tip 532 may disrupt the electrostatic field of a capacitive touchscreen of a client device such that the disruption may cause a change in capacitance. The operating system on the client device may calculate the change in capacitive appropriately to determine the location and force of the change in capacitance. An application stored on the client device may appropriately calculate the resulting location and force of the change to determine the weight of the food item.

Although specific platform apparatuses are discussed above with respect to FIGS. 5A-5B, any variety of structures including a variety of materials and poles tip shapes can be utilized in accordance with embodiments of the invention. Attachments between platforms and poles in accordance with embodiments of the invention are discussed further below.

Attachment of Platforms and Poles

Figure 6A:
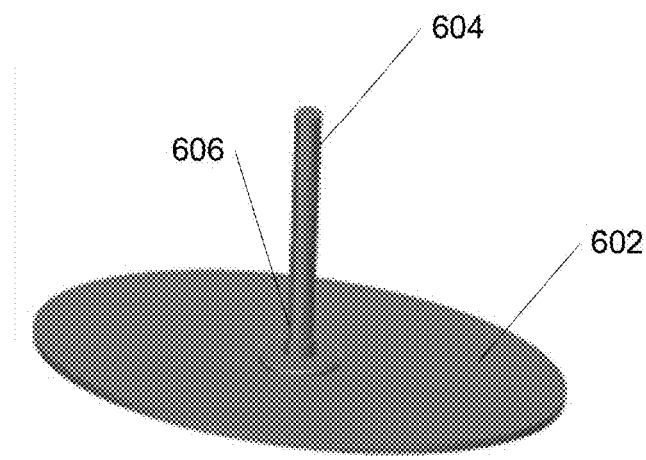
FIGS. 6A-E illustrate an attachment of a platform and a pole in accordance with an embodiment of the invention.
Figure 6B:
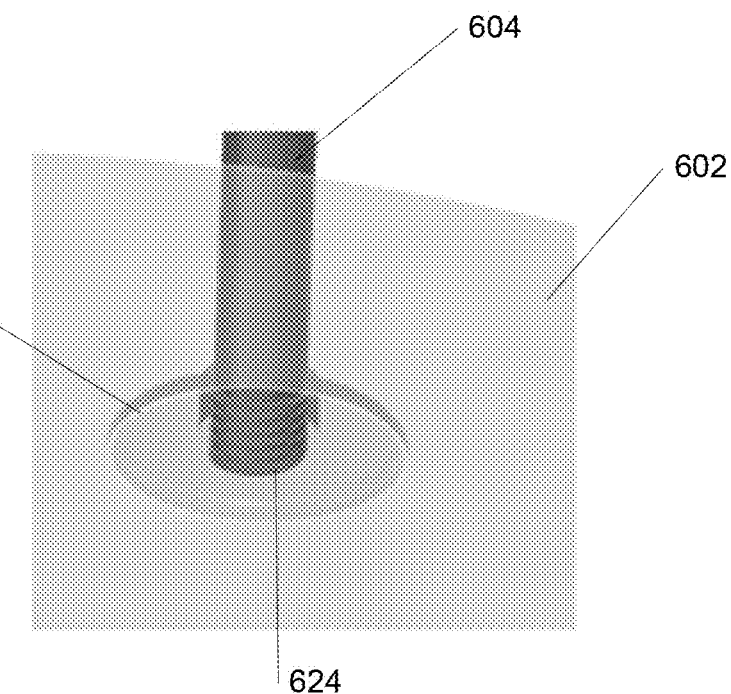

Attachments of a platform and a pole in accordance with embodiments of the invention are illustrated in FIGS. 6A-6E. As illustrated in FIGS. 6A-B, a platform 602 may be attached to a pole 604 through a connection 606 at the center 622 of the platform 602. The connected pole 604 and platform 602 may provide stabilization of the platform apparatus if a food item is placed on the platform 602. The connection 606 may be of the type that an end of the pole 624 may have threads such that the pole 604 may be screwed into the center 622 of the platform of 602. Such a connection, may allow the platform apparatus to be easily disassembled by the user into a pole 604 and a platform 602 for transport and storage. In many embodiments, the material of the pole 604 and the platform 602 may be of the type that the connection 606 does not degrade substantially with continued use of the platform apparatus. For example, potential materials for the platform apparatus include but are not limited to hard plastic, silicon, and metal.

Figure 6C:
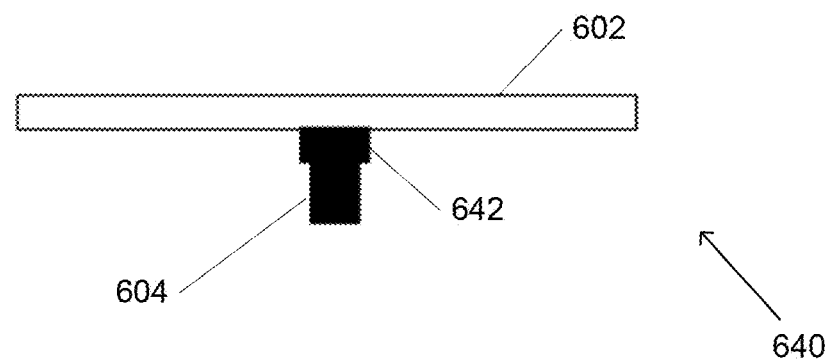

In reference to FIG. 6C, a platform 602 may be attached to the pole 604 at a center of the platform 602 using direction connection. The connection 606 may be of the type that an end 642 of the pole 604 may be directly attached to the center of the platform of 602. Such a connection, may not allow the platform apparatus to be easily disassembled by the user into a pole 604 and a platform 602 for transport and storage. The material of the pole 604 and the platform 602 may be of the type that the connection does not degrade substantially with continued use of the platform apparatus.

Potential materials for the platform apparatus include but are not limited to hard plastic, silicon, and metal.

Figure 6D:
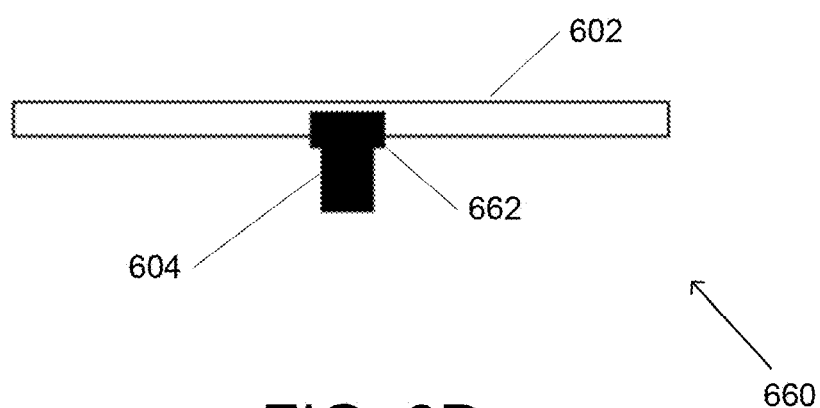

In reference to FIG. 6D, a platform 602 may be attached to the pole 604 at a center of the platform 602 using a snapping mechanism. The connection 606 may be of the type that an end of the pole 604 may snap into the center of the platform of 602. Such a connection, may allow the platform apparatus to be easily disassembled by the user into a pole 604 and a platform 602 for transport and storage. In such embodiments, a first end of the pole 662 be designed to snap snugly into the center of the platform 602. The material of the pole 604 and the platform 602 may be of the type that the connection does not degrade substantially with continued use of the platform apparatus. Potential materials for the platform apparatus include but are not limited to hard plastic, silicon, and metal.

Figure 6E:
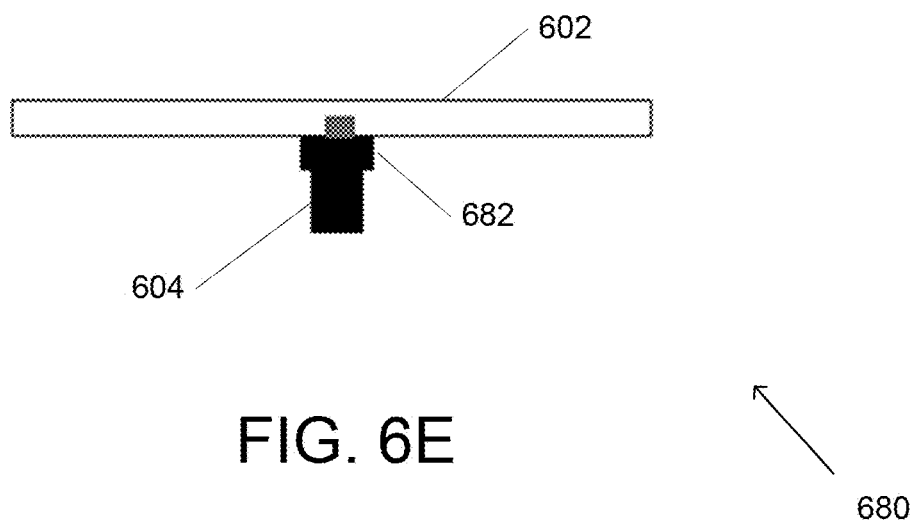

In reference to FIG. 6E, a platform 602 may be attached to the pole 604 at a center of the platform 602 using a button connector 682. The connection may be of the type that an end of the pole 604 may have a button connector such that the pole 604 may be snapped into the center of the platform of 602. Such a connection, may allow the platform apparatus to be easily disassembled by the user into a pole 604 and a platform 602 for transport and storage. The button connector 682 may take a number of shapes including but not limited to a square, rectangle, or circle such that there is a smaller addition to a first end of the pole 604. The material of the pole 604 and the platform 602 may be of the type that the connection 606 does not degrade substantially with continued use of the platform apparatus. Potential materials for the platform apparatus include but are not limited to hard plastic, silicon, and metal.

Although specific attachments between a pole and a platform are discussed above with respect to FIGS. 6A-6E, any variety of attachments including a variety of temporary and permanent connection types can be utilized in accordance with embodiments of the invention. A process for providing nutritional content in accordance with embodiments of the invention are discussed further below.

Providing Nutritional Content

Nutritional content may be provided by measuring a weight of a food item, and calculating nutritional content based on the weight and food data. In many embodiments, measuring the weight and the calculating the nutritional content may be performed using a client device and/or a server in conjunction with scale assemblies as described above.

Figure 7:
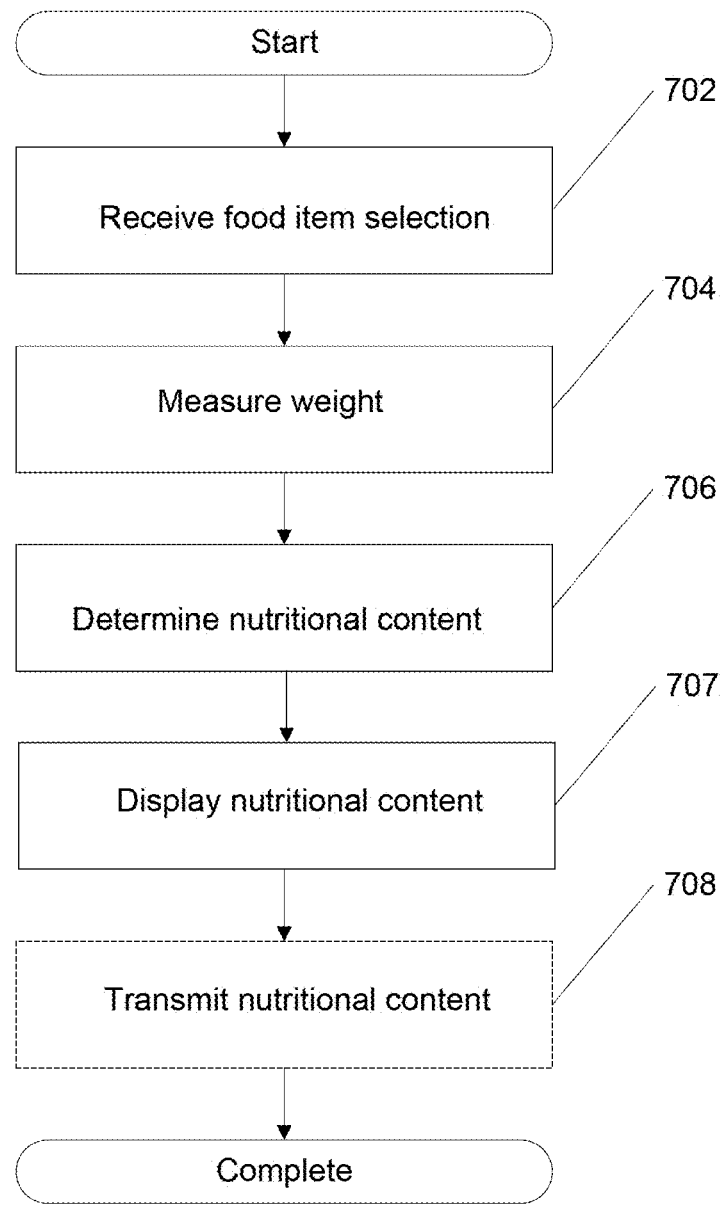
FIG. 7 is a flowcharts of a process for providing nutritional content in accordance with an embodiment of the invention.

A flowchart illustrating a process for providing nutritional content in accordance with an embodiment of the invention is illustrated in FIG. 7. The process 700 may include receiving (702) a food item selection. In some embodiments, the food item selection may include (but not limited to) scanning a barcode or QR code associated with a food item, photographing the food item, positioning the food item in front of a camera and/or searching the food item by the food item's name using voice and/or text input. In various embodiments, the food item selection may be performed using a client device, where the client device may transmit the food item selection to a server via a network, e.g., internet, PSTN, Wi-Fi, etc., as described above. In many embodiments, the server may include a program that provides various functionalities, e.g., sharing data or resources, and/or performing computation. The server may serve multiple client devices. In many embodiments, name of the food and information of the food may be stored in a memory of the client device and/or the server after the food item selection has been received (702). In some embodiments, the server may include (but not limited to) a database server, an application server, a catalog server, a communication server, a computing server, a media server, a proxy server, a virtual server and/or a web server, etc.

In reference to FIG. 7, the process 700 may also include measuring (704) a weight of the food item. In some embodiments, the client device may be configured to measure the weight of the food item, as further described below. The client device may have a pressure sensitive touch screen and the client device may calculate the weight of the food item based on the pressure applied onto the pressure sensitive touch screen when the food item is placed on a scale assembly. As described above, the scale assembly may transfer the weight of the food item to the pressure sensitive touch screen of the client device thereby providing pressure on the touch screen. In some embodiments, the force may be delivered onto the pressure sensitive touch screen directly or indirectly. For example, the force from the food item may cause a layer of the pressure sensitive touch screen to press downward. The pressure sensitive touch screen may sense change due to the force and convert a sensed value into the weight of the food item. The server may receive the measured weight of the food item from the client device. In various embodiment, the server may calculate the weight of the food item, as further described below. In many embodiments, the client device includes a pressure sensitive touch screen and the pressure sensitive touch screen may measure a pressure due to the food item applied onto the pressure sensitive touch screen. The server may receive the measured pressure from the client device. The client device and/or server may calculate the weight of the food item using the measured pressure. For example, the client device and/or server may include data indicating a relationship between the measured pressure and the weight of the food item corresponding to the measured pressure.

In further reference to FIG. 7, the process 700 may further include determining (706) nutritional content of the food item. In some embodiments, the nutritional content may include (but not limited to) at least one of calorie, vitamin, nutrients, sodium, sugar, fat, carbohydrate, minerals, ingredients of the food item. In many embodiments, the client device may determine (706) the nutritional content of the food item based on the measured weight, food item selection, and/or any other additional data. In various embodiments, the server may determine the nutritional content using the food item and the weight of the food item, as further described below. In various embodiments, the nutritional content may be determined on a per serving basis. Further, the client device and/or the server may be configured to store food data including (but not limited to) at least one of name of the food item, calorie, vitamin, nutrients, sodium, sugar, fat, carbohydrate, minerals, ingredients of various foods. The client device and/or the server may pair the food item with the stored food data to calculate the nutritional content corresponding to the weight of the food item. In various embodiments, the food data may be updated by a request from the user or in predetermined interval. In some embodiments, the process 700 may include displaying (707) the nutritional content on the client device. The process 700 may further include transmitting (708) the nutritional content to the server from the client device. In some embodiments, the process 700 may include transmitting (708) the nutritional contention to the client device from the server.

Figure 8:
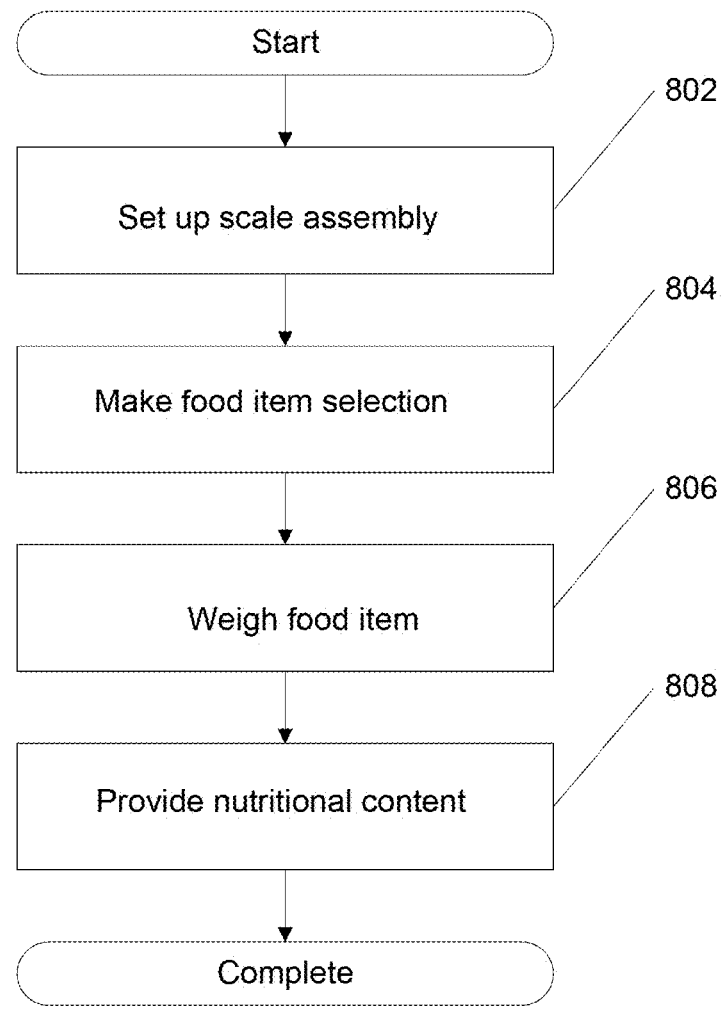
FIG. 8 is a flowchart of another process for providing nutritional content in accordance with an embodiment of the invention.

A flowchart illustrating another process for providing nutritional content in accordance with an embodiment of the invention is illustrated in FIG. 8. The process 800 may include setting up (802) a scale assembly. For example, the scale assembly may initially be in a closed configuration, as described above. In many embodiments, setting up (802) the scale assembly may include placing the scale assembly in to the open configuration, launching an application on the client device, and/or placing the client device between at least one support leg of the scale assembly, as described above. In some embodiments, the scale assembly may be configured to measure a weight of a food item in conjunction with the client device. In various embodiments, the scale assembly may be configured to receive the weight applied by the food item and to measure the force applied onto the client device, as described above. The process 800 may also include making (804) a food item selection on the client device. In some embodiments, a user may make (804) the food item selection before placing the food item on a platform of the scale assembly, as described above. For example, the making (804) the food item selection may include (but is not limited to) scanning a barcode and/or QR code associated with the food item, photographing the food item, positioning the food item in front of a camera and/or searching the food item by the food item's name using voice and/or text input. In many embodiments, the food item selection may be performed using a client device. The process 800 may further include weighing (806) the food item. In some embodiments, the weighing (806) the food item may be performed using the scale assembly in conjunction with the client device. As described above, the client device may have a pressure sensitive touch screen. The scale assembly may be disposed over the client device and configured to apply pressure by the food item to the pressure sensitive touch screen. The client device may be configured to convert the pressure to the weight of the food item and determine the weight of the food item. In some embodiments, in weighing (806) the food item, a force generated and/or lost during the delivering the pressure to the pressure sensitive touch screen may be accounted for using methods known to one of ordinary skill in the art.

In further reference to FIG. 8, the process 800 may further include providing (808) nutritional content. In some embodiments, the client device may be configured to calculate and display the nutritional content. The client device may store food data including (but not limited to) at least one of calorie, vitamin, nutrients, sodium, sugar, fat, carbohydrate, minerals, ingredients of various food items. The client device may calculate the nutritional content based on the food item selection, the weight of the food item and the stored food data. In some embodiments, the client device may display the nutritional content and the user may get the nutritional content. In various embodiments, the server may calculate the nutritional content. The server may determine the nutritional content using the food item and the weight of the food item, as further described below. The server may be configured to store food data including (but not limited to) at least one of calorie, vitamin, nutrients, sodium, sugar, fat, carbohydrate, minerals of various foods. The server may pair the food item with the stored food data to calculate the nutritional content corresponding to the weight of the food item. In many embodiments, the server may transmit the nutritional content to a client device. The client device may provide the nutritional content to the user.

Figure 9:
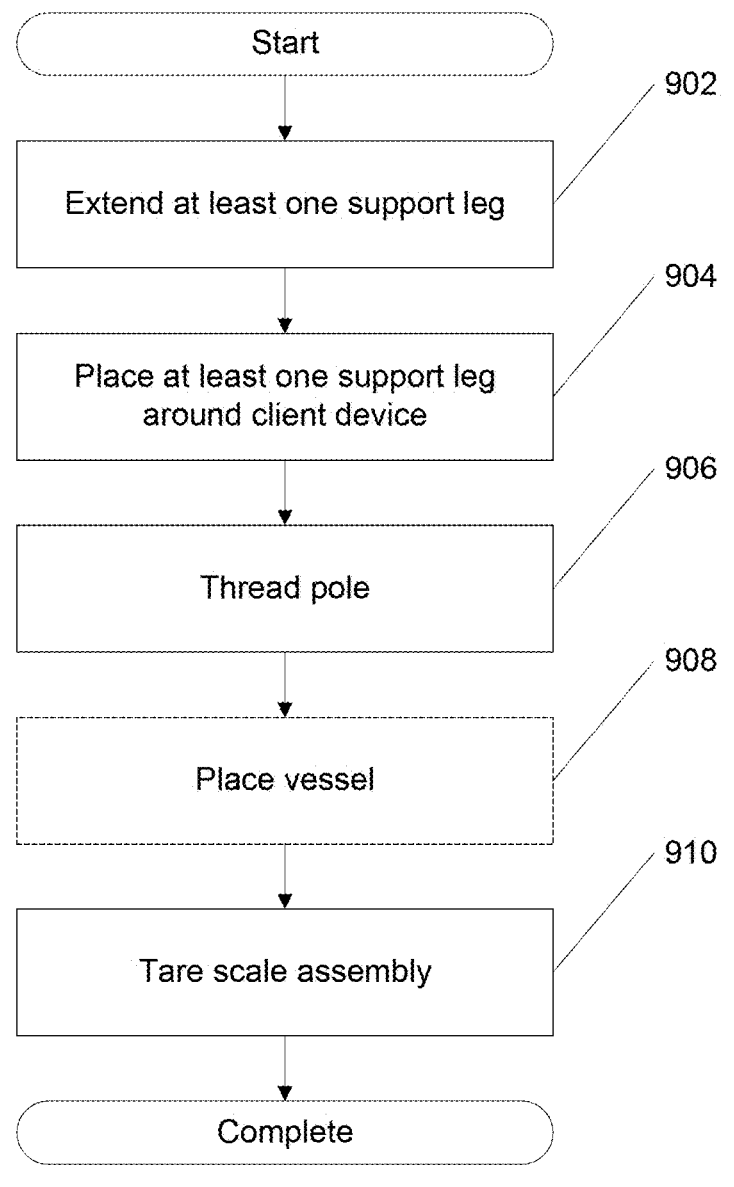
FIG. 9 is a flowchart of a method for flowchart illustrating a process for setting a scale assembly on a client device in accordance with an embodiment of the invention.

A flowchart illustrating a process for setting a scale assembly on a client device in accordance with an embodiment of the invention is illustrated in FIG. 9. The process 900 may include extending (902) at least one support leg. For example, the scale assembly may initially be in a closed configuration and extending (902) at least one support leg may place the scale assembly in to the open configuration. In some embodiments, the scale assembly may include a platform on which food item is received, at least one support leg and a pole configured to apply a weight of the food item to a client device. In various embodiments, the at least one support leg may be configured to support the platform. In many embodiments, the at least support leg may be one leg. The one leg may be folded wall-shaped leg. In some embodiments, the at least support leg may include a plurality of legs. The process 900 may also include placing (904) the at least one support leg around the client device. In many embodiments, the plurality legs may be spaced apart creating an open space for placing the client device within the open space. The process 900 may further include threading (906) the pole. In some embodiments, the scale assembly may further include a centerpiece having a hole receiving the pole, as described above. The pole may be inserted or threaded in the hole. In many embodiments, the pole may include a capacitive material in its end portion. The capacitive material may activate the client device. In various embodiments, the pole may support the platform and stand on a pressure sensitive touch screen of the client device. The platform may be positioned over the client device. The process 900 may also include placing (908) a vessel. In some embodiments the vessel may be placed on the platform. The vessel may be configured to receive the food item. The vessel may prevent the food item from being dropped outside the platform. In some embodiments, the placing (908) the vessel may be omitted. The process 900 may further include taring (910) the scale assembly. In some embodiments, the taring (910) the scale assembly may be performed by the client device without the user's command after the scale assembly is positioned on the client device in a predetermined time. In many embodiments, the taring (910) the scale assembly may be performed by the user's command. The user's command may include voice command and/or touching the client device.

Figure 10:
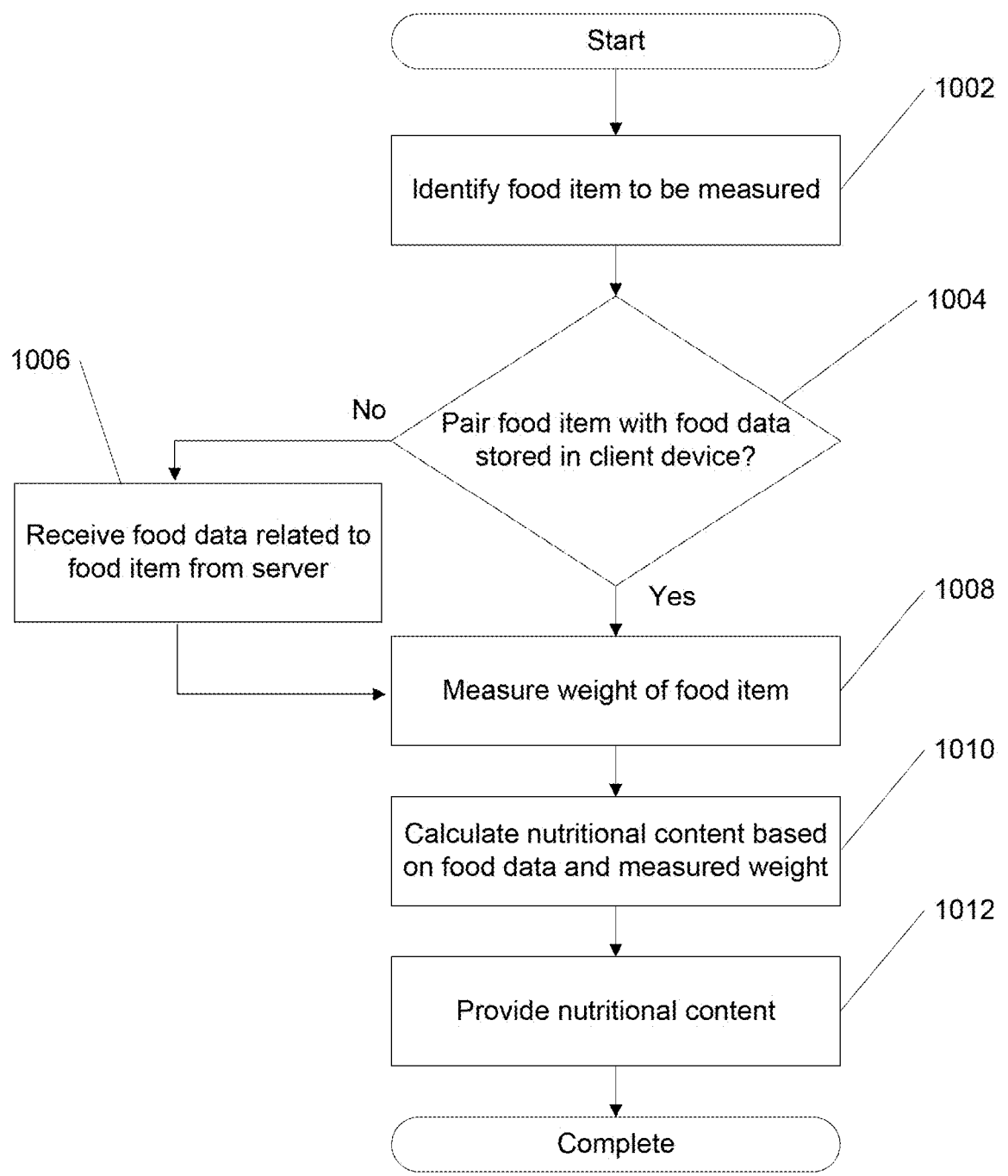
FIG. 10 is flowchart illustrating another process for providing nutritional content in accordance with an embodiment of the invention.

FIG. 10 is a flowchart illustrating another process for providing nutritional content in accordance with an embodiment of the invention. The process 1000 may include identifying (1002) the food item to be measured. In various embodiments, the identifying (1002) food item may include (but not limited to) scanning a barcode or QR code associated with the food item, photographing the food item, positioning the food item in front of a camera and/or searching the food item by the food item's name using voice and/or text input. In many embodiments, the identified food item information may be stored in a client device or be sent to a server. The process 1000 may also include pairing (1004) the food item with food data stored in the client device. In some embodiments, the food data may include (but not limited to) at least one of name of the food calorie, vitamin, nutrients, sodium, sugar, fat, carbohydrate, minerals, ingredients of various foods. By pairing (1004) the food item with food data, the client device may obtain nutritional content of the food item. The process 1000 may further include receiving (1006) food data related to the identified food item from the server. In some embodiments, when the client device does not have the food data related to the identified food item (1004), the client device may request the food data related to the identified food item to the server by sending the identified food item to the server. The server may provide the client device the food data related to the identified food item. In various embodiments, the server may send not only the food data related to the identified food item but also additional food data. In many embodiments, the server may pair the food item with the server's food data and send nutritional content of the identified food item in response to the client device. In various embodiments, the server may send additional food data in predetermined interval or by request of the client device. In various embodiments, the client device may request any information to the server. The process 1000 may also include measuring (1008) a weight of the food item. In various embodiments, the client device may have a pressure sensitive touch screen. The client device may be configured to convert a pressure applied to the pressure sensitive touch screen to the weight of the food item and determine the weight of the food item. In some embodiments, the weight of the food item may be calculated by the client device based on the pressure applied to the pressure sensitive touch screen, and accounting for a force generated and/or lost during the delivering the pressure to the client device. For example, a friction force between the client device and the scale assembly may be accounted for. In many embodiments, the client device may transmit the measured weight to the server. The process 1000 may further include calculating (1010) nutritional data (may also be referred to as "nutritional content") per serving size based on the food data and the measured weight. In some embodiments, the client device may store the food data or receive additional food data paired with the identified food item. Accordingly, the client device may calculate the nutritional data per serving size based on the food data and the measured weight. For example, the client device may store nutritional content (e.g., calorie, vitamin, nutrients, sodium, sugar, fat, carbohydrate, minerals, ingredients) of food item A per 100 g. When the weight of the food item A is 20 g, the client device may calculate the nutritional content of food item A corresponding to 20 g. In various embodiments, the server may calculate the nutritional data per serving size based on the food data and the measured weight. The client device may transmit the weight of the food item to the server and the server may calculate the nutritional contents per serving size based on the food data and the measured weight. The server may transmit the calculated nutritional contents to the client server. The process 1000 also include providing (1012) the nutrition content to a user. In some embodiments, the client device may speak or display the nutrition content.

Figure 11:
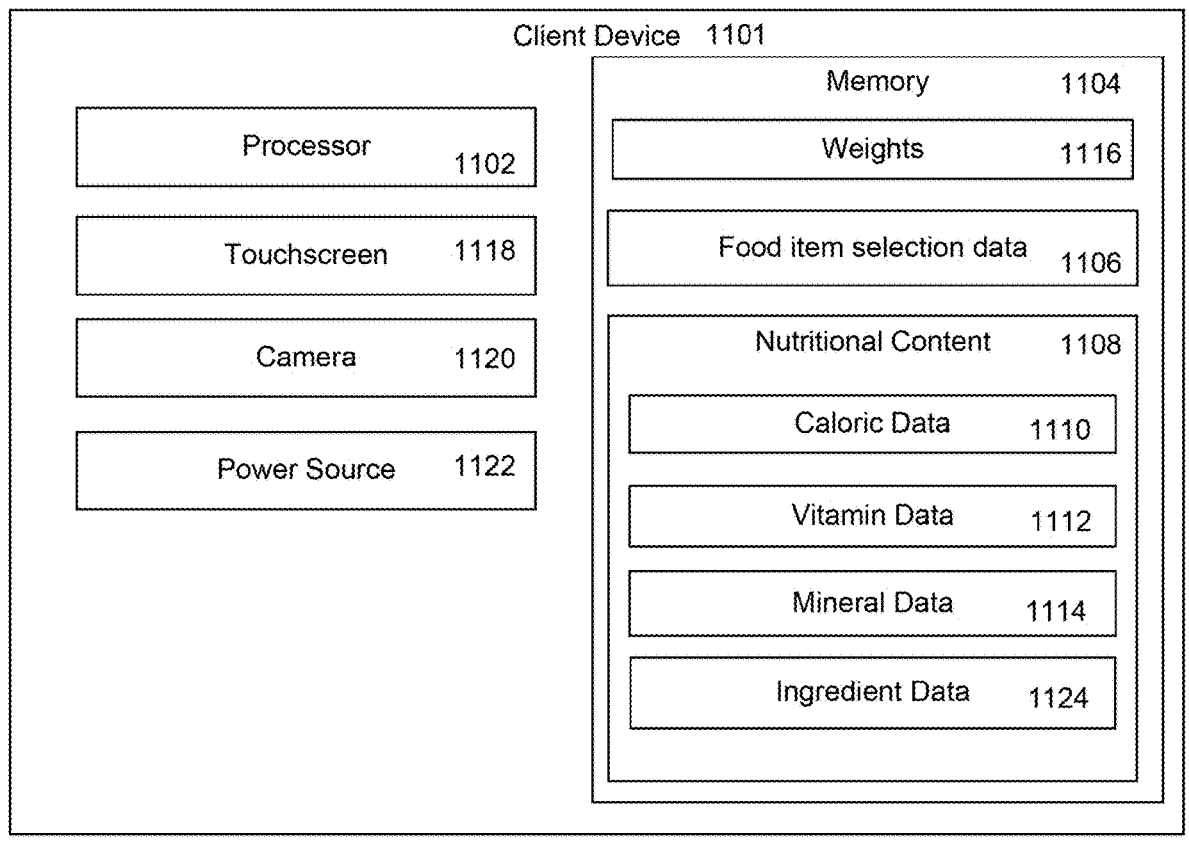
FIG. 11 is a block diagram of the client device in accordance with an embodiment of the invention.

A block diagram illustrating a client device for providing nutritional content in accordance with an embodiment of the invention is illustrated in FIG. 11. The illustration shows a client device 1101 that includes a processor 1102, a memory 1104, a touchscreen 1118, a camera 1120, and a power source 1122. In many embodiments, the client device 1101 may include (but not limited to) a mobile device, a PDA, notebook computer or any other portable device. In some embodiments, the memory is a machine readable media that is utilized to store machine readable instructions that configure the processor 1102. In various embodiments, the memory 1104 may include a volatile memory and/or a non-volatile memory. The memory may contain an application utilized to configure the processor 1102 to provide nutritional content 1108. The memory may store weight of the food item which is measured and/or weight of a client device and a scale assembly. For example, the memory may store the weight of the food item after measuring the weight of the food item. The memory may store nutritional content 1108 including (but not limited to) at least one of calorie, vitamin, nutrients, sodium, sugar, fat, carbohydrate, minerals, ingredients of various foods. For example, as illustrated in FIG. 11, the memory 1104 may store caloric data 1110, vitamin data 1112, mineral data 1114 and ingredient data 1124. In some embodiments, the memory may store a food item selection data. For example, the memory may store the food item after a user makes the client device recognize the food item. In some embodiments, the touchscreen 1118 may include a pressure sensitive touch screen and/or a capacitive touch screen.

Although specific processes and hardware implementations for providing nutritional content are discussed above with respect to FIGS. 7-11, any of a variety of processes and hardware implementations as appropriate to the requirement of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A scale assembly for providing nutritional content, the scale assembly in connection with a client device, the scale assembly comprising:
   a platform for receiving a food item;
   a pole connected to a center portion of the platform, wherein the pole applies a pressure to a surface of the client device based on a weight of the food item;
   a centerpiece having a hole for receiving the pole such that the pole moves vertically through the hole;
   at least one support leg, wherein the at least one support leg is connected to the centerpiece and provides support to the scale assembly; and
   wherein the pressure applied by the pole to the surface of the client device is used to calculate the nutritional content of the food item.

2. The scale assembly of claim 1, wherein the pole rotates but has limited movement around a horizontal direction.

3. The scale assembly of claim 1, wherein the pole is threaded through the hole of the centerpiece.

4. The scale assembly of claim 1, wherein a first end of the pole is connected to a bottom surface of the platform.

5. The scale assembly of claim 4, wherein the first end of the pole is threaded such that the first end of the pole is screwed into a receiving hole in the bottom surface of the platform.

6. The scale assembly of claim 4, wherein the first end of the pole is flat such that the first end of the pole snaps into a receiving hole in the bottom surface of the platform.

7. The scale assembly of claim 4, wherein the first end of the pole is flat such that the first end of the pole adheres to the bottom surface of the platform.

8. The scale assembly of claim 4, wherein a second end of the pole applies the pressure to the surface of the client device.

9. The scale assembly of claim 8, wherein the second end of the pole is a hemisphere shape.

10. The scale assembly of claim 8, wherein the second end of the pole includes a cushion material.

11. The scale assembly of claim 1, wherein:
    the client device includes a digital scale for measuring the pressure applied based on the weight of the food item; and
    the weight of the food item is calculated by the client device based on the pressure applied to the client device, and accounting for a frictional force between the pole and the hole.

12. The scale assembly of claim 11, wherein the weight of the food item is calculated by the client device further based on accounting for a pressure dispersed along the at least one support leg.

13. The scale assembly of claim 11, wherein the surface of the client device comprises a pressure sensitive touch screen.

14. The scale assembly of claim 1, wherein the at least one support leg swivels around the centerpiece.

15. The scale assembly of claim 1, wherein the at least one support leg includes a first leg, second leg, and third leg that are spaced apart creating an open space for placing the client device within the open space.

16. The scale assembly of claim 1, wherein the client device calculates the nutritional content of the food item based on the pressure applied by the pole to the surface.

17. The scale assembly of claim 16, wherein the client device calculates the nutritional content of the food item based on an identification of the food item wherein the user selects the food item on the client device to provide the identification of the food item.

18. The scale assembly of claim 16, wherein the client device calculates the nutritional content of the food item based on the user scanning the food item with the client device to provide the identification of the food item.

19. The scale assembly of claim 1, wherein the client device measures the pressure applied by the pole and transmits a calculated weight to a server.

20. The scale assembly of claim 19, wherein the server calculates the nutritional content of the food item based on the calculated weight and the identification of the food item.

\* \* \* \* \*